(12) United States Patent
Sinharay et al.

(10) Patent No.: US 11,668,621 B2
(45) Date of Patent: Jun. 6, 2023

(54) METHOD AND SYSTEM FOR INSPECTING AND DETECTING FLUID IN A PIPELINE

(71) Applicant: Tata Consultancy Services Limited, Mumbai (IN)

(72) Inventors: Arijit Sinharay, Kolkata (IN); Gitesh Kulkarni, Bangalore (IN); Abhijeet Gorey, Kolkata (IN); Chirabrata Bhaumik, Kolkata (IN); Tapas Chakravarty, Kolkata (IN); Arpan Pal, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/453,031

(22) Filed: Nov. 1, 2021

(65) Prior Publication Data

US 2022/0136924 A1    May 5, 2022

(51) Int. Cl.
    *G01M 3/24*     (2006.01)
    *F17D 5/06*     (2006.01)
    *G01S 19/01*    (2010.01)

(52) U.S. Cl.
    CPC ............. *G01M 3/243* (2013.01); *G01S 19/01* (2013.01)

(58) Field of Classification Search
    CPC .......... G01M 3/00; G01M 3/24; G01M 3/243; G01S 19/01; F17D 5/00–06
    See application file for complete search history.

(56) References Cited

U.S. PATENT DOCUMENTS

| 4,001,764 A | 1/1977 | Holland et al. |
| 7,526,944 B2 | 5/2009 | Sabata et al. |
| 8,973,444 B2 | 3/2015 | Hill et al. |

FOREIGN PATENT DOCUMENTS

| CN | 101832472 A | 3/2013 | |
| CN | 104948915 A | 9/2015 | |
| EP | 0714019 A1 * | 5/1996 | ............. G01M 3/24 |
| KR | 102423388 B1 * | 7/2022 | ............. G01M 3/24 |

* cited by examiner

*Primary Examiner* — Nguyen Q. Ha
(74) *Attorney, Agent, or Firm* — Finnegan, Henderson, Farabow, Garrett & Dunner, LLP (57) ABSTRACT

Fluids are normally transported from one place to another through pipelines. It is essential to monitor the pipeline to avoid leakage or theft. It is expensive and not feasible to install cameras and sensors along the whole length of the pipeline. A system and method for inspecting and detecting fluid leakage in a pipeline has been provided. The system is using vibration sensors along with pressure sensors to detect the leakage or theft along with the exact location of the leakage or theft. The pressure sensors are mounted on the pipeline so that the fluid touches the diaphragm of the pressure sensors to sense the wave generated due to leakage. The vibration sensors are mounted on top of the pipeline surface and on the nearby ground to eliminate general noise conditions. Moreover, two pressure sensors are also installed at opposite sides to pinpoint the leakage location.

14 Claims, 6 Drawing Sheets

FIG. 5

METHOD AND SYSTEM FOR INSPECTING AND DETECTING FLUID IN A PIPELINE

CROSS-REFERENCE TO RELATED APPLICATIONS AND PRIORITY

This U.S. patent application claims priority under 35 U.S.C. § 119 to: India Application No. 202021047845, filed on Nov. 2, 2020. The entire contents of the aforementioned application are incorporated herein by reference.

TECHNICAL FIELD

The disclosure herein generally relates to the field of fluid leak detection, and, more particularly, to a method and system for inspecting and detecting fluid such as oil and gas leakage in a pipeline.

BACKGROUND

Various fluids such as oils and gases are normally transported from one place to another through pipelines which run up to thousands of kilometers. Due to various reasons, there are chances of leakage of fluid from the pipeline.

Timely leak detection in oil and gas pipelines is essential to protect economic loss as well as possible catastrophe. In addition to that there are also probability of theft of oils and gases. Therefore, it is essential to monitor the pipeline to avoid such kind of instances.

One of the traditional methods used in the prior art is to install sensors or cameras at a regular distance to monitor the pipelines. Since oil and gas pipelines runs more than thousand kilometers, it is not feasible to put frequent sensors on the pipeline as it makes the installation cost as well as maintenance too high to afford and difficult to operate. So sensing technique is required to probe long segment of pipelines in an affordable manner.

SUMMARY

Embodiments of the present disclosure present technological improvements as solutions to one or more of the above-mentioned technical problems recognized by the inventors in conventional systems. For example, in one embodiment, a system for inspecting and detecting fluid leakage in a pipeline is provided. The system comprises a first vibration sensor, a second vibration sensor, a third vibration sensor, a fourth vibration sensor, a first pressure sensor, a second pressure sensor, one or more hardware processors and a memory. The first vibration sensor, the second vibration sensor, the third vibration sensor, and the fourth vibration sensor capture vibration signals. The first vibration sensor is installed at a first location on the pipeline. The second vibration sensor is installed at a second location on the pipeline, wherein the first location and the second location are two ends of a segment from amongst a plurality of segments of the pipeline, wherein the plurality of segments is distributed along a length of the pipeline at equal distance from each other. The third vibration sensor is installed at the first location on ground. The fourth vibration sensor is installed at the second location on the ground. The first pressure sensor and the second pressure sensor capture negative pressure wave signals generated due to leakage in the pipeline. The first pressure sensor is installed at the first location on the pipeline. The second pressure sensor is installed at the second location on the pipeline. The memory is in communication with the one or more hardware processors, wherein the one or more first hardware processors are configured to execute programmed instructions stored in the one or more first memories, to: calculate, a first signal (S1) as a difference between the signals captured from the first vibration sensor and the third vibration sensor present at the first location; calculate a second signal (S2) as a difference between the signals captured from the second vibration sensor and the fourth vibration sensor present at the second location; calculate a third signal (S3) as a difference between the signals captured from the first pressure sensor and the third vibration sensor; calculate a fourth signal (S4) as a difference between the signals captured from the second pressure sensor and the fourth vibration sensor; digitize the first signal (S1), the second signal (S2), the third signal (S3), and the fourth signal (S4) along with a global positioning system (GPS) time stamping; extract a plurality of features from a one-minute time window of each of the first signal (S1), the second signal (S2), the third signal (S3), and the fourth signal (S4); select a set of features out of the plurality of features using a feature selection algorithm, wherein the set of features are selected based on user defined condition; provide the selected set of features to a pre-generated classifier model, wherein the pre-generated classifier model is generated by simulating a normal condition, a leakage condition and a theft condition; and detect at least one of the normal condition, the leakage condition in the pipeline and the theft condition in the pipeline using the pre-generated classifier model.

In another aspect, a method for inspecting and detecting fluid leakage in a pipeline is provided. Initially, vibration signals are captured from a first vibration sensor, a second vibration sensor, a third vibration sensor and a fourth vibration sensor. The first vibration sensor is installed at a first location on the pipeline. The second vibration sensor is installed at a second location on the pipeline, wherein the first location and the second location are two ends of a segment from amongst a plurality of segments of the pipeline, wherein the plurality of segments is distributed along a length of the pipeline at equal distance from each other. The third vibration sensor is installed at the first location on ground. The fourth vibration sensor is installed at the second location on the ground. In the next step, negative pressure wave signals generated due to leakage in the pipeline are captured using a first pressure sensor and a second pressure sensor. The first pressure sensor is installed at the first location on the pipeline, and the second pressure sensor is installed at the second location on the pipeline. Further, a first signal (S1) is calculated as a difference between signals captured from the first vibration sensor and the third vibration sensor present at the first location. A second signal (S2) is calculated as a difference between signals captured from the second vibration sensor and the fourth vibration sensor present at the second location. A third signal (S3) is calculated as a difference between signals captured from the first pressure sensor and the third vibration sensor. A fourth signal (S4) is calculated as a difference between signals captured from the second pressure sensor and the fourth vibration sensor. In the next step, the first signal (S1), the second signal (S2), the third signal (S3), and the fourth signal (S4) are digitized along with a global positioning system (GPS) time stamping. A plurality of features is then extracted from a one-minute time window of each of the first signal (S1), the second signal (S2), the third signal (S3), and the fourth signal (S4). Further, a set of features is selected out of the plurality of features using a feature selection algorithm, wherein the set of features are selected based on user defined condition. In the next step, the selected set of features is provided to a pre-generated classifier model, wherein the pre-generated classifier model is generated by simulating a normal condition, a leakage condition and a theft condition. And finally, at least one of the normal condition, the leakage condition in the pipeline and the theft condition in the pipeline is detected using the pre-generated classifier model.

In yet another aspect, one or more non-transitory machine-readable information storage mediums comprising one or more instructions which when executed by one or more hardware processors cause inspecting and detecting fluid leakage in a pipeline is provided. Initially, vibration signals are captured from a first vibration sensor, a second vibration sensor, a third vibration sensor and a fourth vibration sensor. The first vibration sensor is installed at a first location on the pipeline. The second vibration sensor is installed at a second location on the pipeline, wherein the first location and the second location are two ends of a segment from amongst a plurality of segments of the pipeline, wherein the plurality of segments is distributed along a length of the pipeline at equal distance from each other. The third vibration sensor is installed at the first location on ground. The fourth vibration sensor is installed at the second location on the ground. In the next step, negative pressure wave signals generated due to leakage in the pipeline are captured using a first pressure sensor and a second pressure sensor. The first pressure sensor is installed at the first location on the pipeline, and the second pressure sensor is installed at the second location on the pipeline. Further, a first signal (S1) is calculated as a difference between signals captured from the first vibration sensor and the third vibration sensor present at the first location. A second signal (S2) is calculated as a difference between signals captured from the second vibration sensor and the fourth vibration sensor present at the second location. A third signal (S3) is calculated as a difference between signals captured from the first pressure sensor and the third vibration sensor. A fourth signal (S4) is calculated as a difference between signals captured from the second pressure sensor and the fourth vibration sensor. In the next step, the first signal (S1), the second signal (S2), the third signal (S3), and the fourth signal (S4) are digitized along with a global positioning system (GPS) time stamping. A plurality of features is then extracted from a one-minute time window of each of the first signal (S1), the second signal (S2), the third signal (S3), and the fourth signal (S4). Further, a set of features is selected out of the plurality of features using a feature selection algorithm, wherein the set of features are selected based on user defined condition. In the next step, the selected set of features is provided to a pre-generated classifier model, wherein the pre-generated classifier model is generated by simulating a normal condition, a leakage condition and a theft condition. And finally, at least one of the normal condition, the leakage condition in the pipeline and the theft condition in the pipeline is detected using the pre-generated classifier model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Oils, gases, chemicals and other fluids are normally transported from one place to another through the pipelines. Due to various reasons, there are chance of leakage of fluid from the pipeline. It is essential to monitor the pipeline to avoid such kind of instances. There exist few methods in the art for timely detection of leakage and theft of oils and gases. There is also an optic based technique used for the sensing. In this technique, four layers of optic fibers need to be laid along the pipeline to work smoothly and optimally. So, installation is very challenging, and it increases the cost of installation and maintenance.

The present disclosure herein provides a system and a method for inspecting and detecting fluids such as oil and gas leakage in a pipeline. The system is using a plurality of vibration sensors along with a plurality of pressure sensors to detect the leakage or theft along with the exact location of the leakage or theft. The plurality of pressure sensors is mounted on the pipeline so that the fluid touches the diaphragm of the plurality of pressure sensors. The plurality of vibration sensors is mounted on top of the pipeline surface. Further, another vibration sensor is also mounted on the nearby ground to eliminate general noise conditions (seismic waves, etc.). Since the negative pressure waves contain low frequency waves (infrasound range) it can travel a long distance through the fluid inside the pipeline. Thus, the pressure sensors can register arrival of such waves to indicate possible leakage. Moreover, two such sensors installed at opposite sides can pin point the leakage location. However, very small leakages or oil drains building up slowly (theft operation) may not trigger the negative pressure waves and cannot be detected by the installed pressure sensor. Here, the plurality of vibration sensors installed on the pipe surface are configured to sense distinct infrasonic vibrations signatures generated by the small leakages.

The transportation of fluid across the pipelines are generally under pressure, i.e., the pipelines have a high pressure inside them. Whenever there is a disturbance in the pipeline due to leakage or some other reason, there is a change in the pressure inside the pipeline, which is called as a negative pressure. The negative pressure travels in both directions, upstream and downstream. The negative pressure waves are generally in a low frequency range in the range of 50 Hz to 100 Hz, it can travel to a long distance up to 10 miles. These negative pressure waves can be sensed using the pressure sensors. In addition to that, the negative pressure also contains some infrasound range of pressure waves, which can be also sensed. Further, not only sensing, it is also possible to pin point the exact location of the leakage or disturbance along the pipeline.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
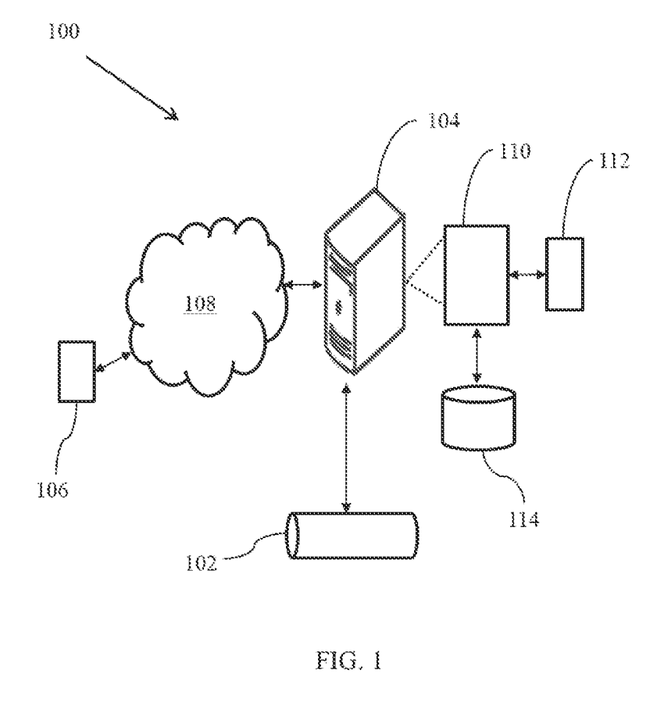
FIG. 1 illustrates a block diagram of a system for inspecting and detecting fluid leakage in a pipeline according to some embodiments of the present disclosure.
Figure 2:
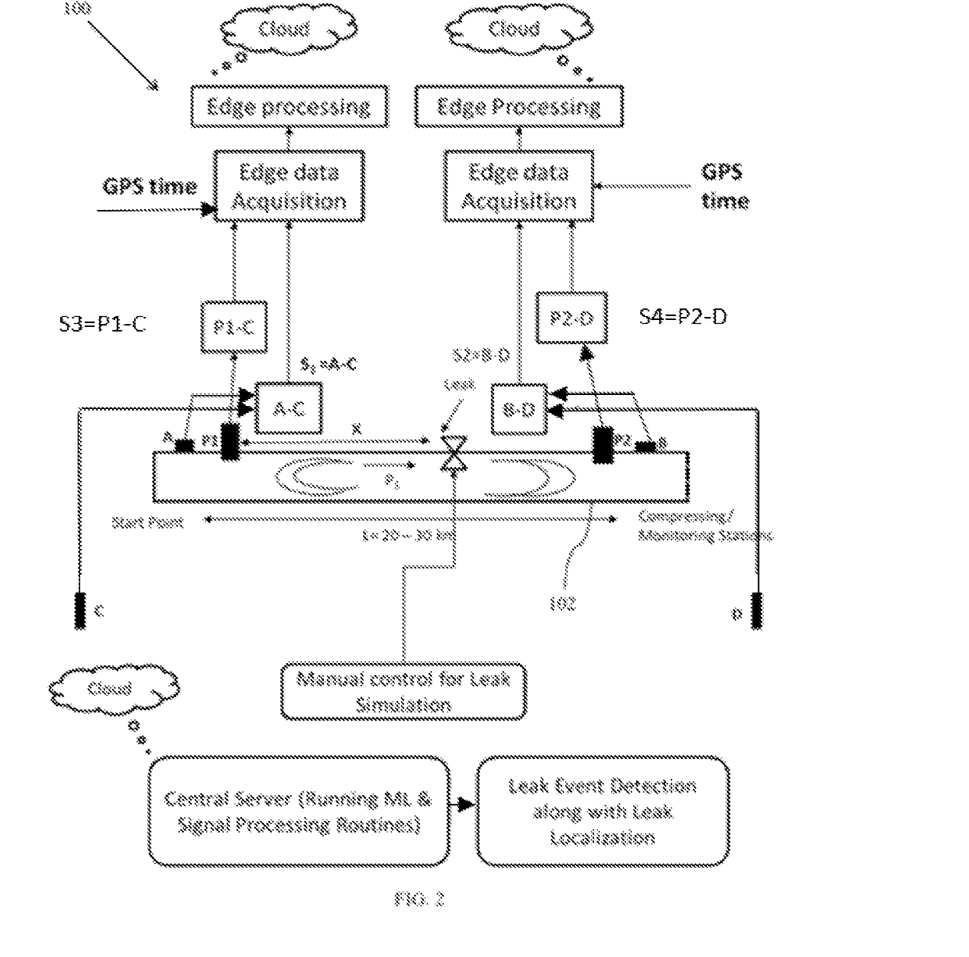
FIG. 2 is a schematic diagram of the system (of FIG. 1) for inspecting and detecting fluid leakage in a pipeline according to some embodiments of the present disclosure.

FIG. 1 illustrates a block diagram of a system 100 and FIG. 2 is a schematic diagram of the system 100 for inspecting and detecting fluid leakage in a pipeline 102. Although the present disclosure is explained considering that the system 100 is implemented on a server, it may also be present elsewhere such as a local machine. It may be understood that the system 100 comprises one or more computing devices 104, such as a laptop computer, a desktop computer, a notebook, a workstation, a cloud-based computing environment and the like. It will be understood that the system 100 may be accessed through one or more input/output interfaces collectively referred to as I/O interface 106. Examples of the I/O interface 106 may include, but are not limited to, a user interface, a portable computer, a personal digital assistant, a handheld device, a smartphone, a tablet computer, a workstation and the like. The I/O interface 106 are communicatively coupled to the system 100 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 100 through communication links.

The system 100 may be implemented in a workstation, a mainframe computer, a server, and a network server. In an embodiment, the computing device 104 further comprises one or more hardware processors 110, one or more memory 112, hereinafter referred as a memory 112 and a data repository 114, for example, a repository 114 or a database 114. The memory 112 is in communication with the one or more hardware processors 110, wherein the one or more hardware processors 110 are configured to execute programmed instructions stored in the memory 112, to perform various functions as explained in the later part of the disclosure. The repository 114 may store data processed, received, and generated by the system 100.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

According to an embodiment of the disclosure, a schematic representation of the placement of a plurality of sensors of system 100 for monitoring fluid pipeline 102 is shown in FIG. 2. FIG. 2 shows a segment of the pipeline 102 containing the plurality of sensors present at two ends of the segment. It may be appreciated that the set of sensors are equidistantly along the length of the pipeline. As shown in the figure, the system 100 comprises four sensitive vibration sensors for sensing infrasonic range. The four vibration sensors are referred as a first vibration sensor (A), a second vibration sensor (B), a third vibration sensor (C) and a fourth vibration sensor (D). The first vibration sensor (A) is installed at a first location on the pipeline. The second vibration sensor (B) is installed at a second location on the pipeline. The first and the second vibration sensors (A and B) are installed on the surface of the pipeline. The first location and the second location are two ends of a segment from amongst a plurality of segments of the pipeline, wherein the plurality of segments is distributed along a length of the pipeline at equal distance from each other. The third vibration sensor (C) is installed at the first location on ground below the first vibration sensor (A). And the fourth vibration sensor (D) is installed at the second location on the ground below the second vibration sensor (A).

In an example, the sensor C is at a distance of 20 meters from sensor A and sensor D is at a distance of 20 meters from sensor B, while, the distance between the sensor A and sensor B are about 20 kms. Though, it may be appreciated that the distance between the first location and the second location can be slightly varied by the user.

According to an embodiment of the disclosure, the system 100 also comprises a first pressure sensor (P1) and a second pressure sensor (P2). The first and the second pressure sensors (P1 and P2) are installed on the pipeline 102 in such a way that their diaphragm is at direct contact of the fluid inside the pipeline 102. In an example, the first pressure sensor (P1) and the second pressure sensor (P2) are also installed about 20 kms apart. The first pressure sensor (P1) is at the first location and the second pressure sensor (P2) is at the second location. The first location is referred as the collective location of the first vibration sensor (A), the third vibration sensor (C) and the first pressure sensor (P1). The second location is referred as the collective location of the second vibration sensor (B), the fourth vibration sensor (D) and the second pressure sensor (P2).

According to an embodiment of the disclosure, the first pressure sensor P1 and the second pressure sensor P2 picks up the negative pressure waves directly, generated due to leakage or theft in the pipeline 102. The first and the second vibration sensors (A and B) picks up vibration due to the negative pressure waves at some degree and also picks up any other disturbances from surroundings. Any other disturbance from the surrounding may be due to car or person/animal passing by the pipe, corrosion in the pipeline or mild seismic vibrations etc. Any other disturbance may also be captured from any infrasonic noise created on the pipe surface at large distances. The third and the fourth vibration sensors (C and D) is configured to pick up the local disturbances, such as like fluid sloshing due to seismic waves etc.

The difference between signal captured from the first vibration sensor (A) and third vibration sensor (C) is A-C, and the difference between signal captured from the second vibration sensor (B) and the fourth vibration sensor (D) will be B-D. A-C and B-D gives signal that are generated on the pipeline surface itself. These two are configured to capture the negative pressure wave information (as the fluid carrying the negative pressure wave vibration will couple to the pipe surface as well) or any activities on the pipeline at distant locations.

In the present embodiment,
the difference between the signals captured from the first vibration sensor (A) and third vibration sensor (C), i.e., A-C is termed as signal S1,
the difference between the signals captured from the second vibration sensor (B) and fourth vibration sensor (D), i.e., B-D is termed as signal S2.
Similarly, the difference between the signals captured from the first pressure sensor (P1) and the third vibration sensor (C), i.e., P1-C is termed as signal S3, and
the difference between the signals captured from the second pressure sensor (P2) and the fourth vibration sensor (D), i.e., P2-D signal is termed as S4.

Thus, the signal S3 and the signal S4 will be free from any influence of the local disturbances like fluid sloshing due to seismic waves etc. Now, these signals are then digitized with GPS time stamping so that later they can be synchronized while analyzing by a central server.

According to an embodiment of the disclosure, a machine learning classifier model is generated from the signals S1, S2, S3 & S4 using data collected for leakage and no-leakage conditions (leak can be simulated by opening up some valves) along with slow oil suctions and human activities as drilling etc. on the pipe (simulating theft conditions). Once the classifier model is generated it is applied to detect leak and/or theft in real time. Since both the negative pressure waves in fluid and infrasound generated on pipe surface travel at a speed of sound, S1, S2, S3, S4 signal generated by leakage and theft can be detected in a very fast manner.

Figure 3:
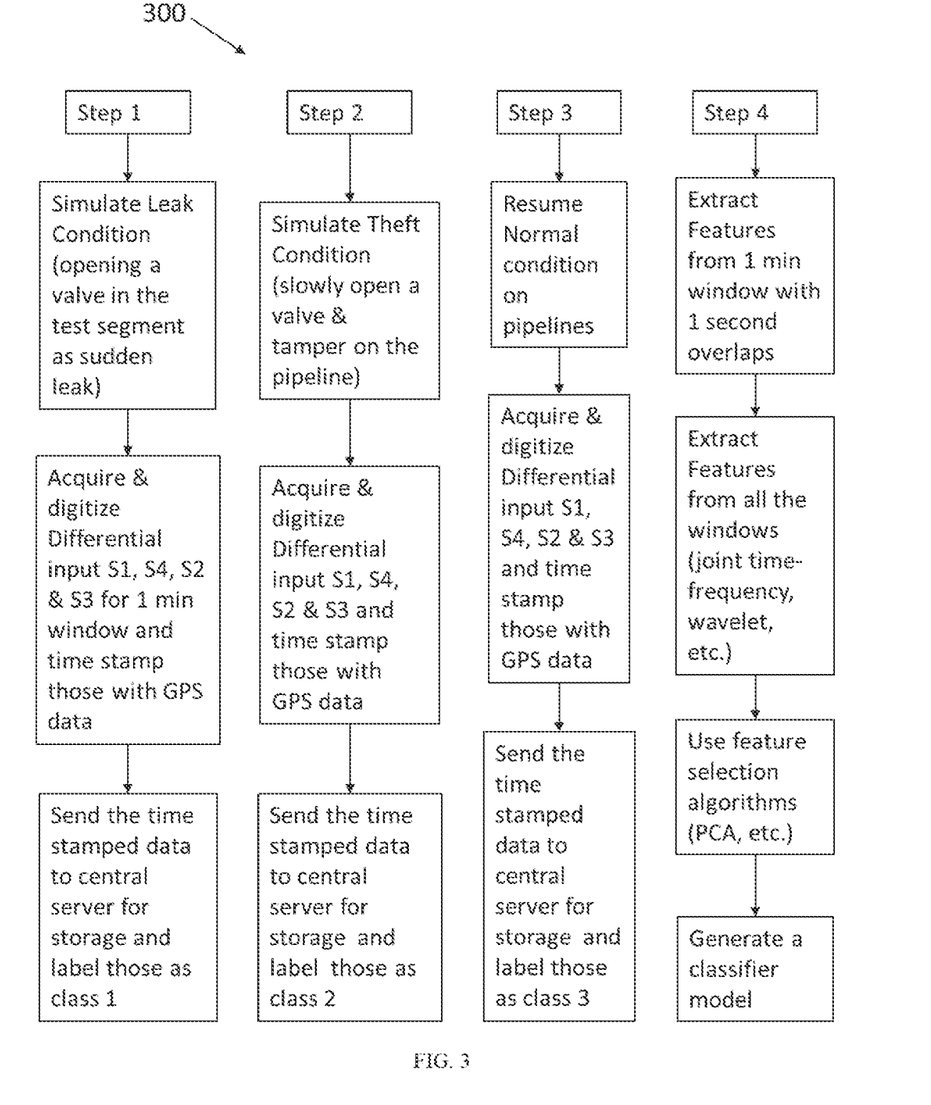
FIG. 3 illustrates a flowchart for generating a classifier model in accordance with some embodiments of the present disclosure.

According to an embodiment of the disclosure, a flow-chart 300 illustrating the steps involved in generating the classifier model is shown in FIG. 3. The model generation comprises four major steps. In the step 1, leakage condition is simulated in a controlled environment. The simulation is achieved by opening a valve in the test segment as sudden leak. Further, differential input signals S1, S4, S2 & S3 are acquired and digitized for a predefined time window such as 1 min window. This digitized signal is then time stamped with GPS data. And finally, the time stamped data is sent to the central server for storage and labeled as class 1.

In the step 2, theft condition is simulated in a controlled environment. The simulation is achieved by slowly opening the valve and tamper on the pipeline. Further, differential input signals S1, S4, S2 & S3 are acquired and digitized. This digitized signal is then time stamped with GPS data. And finally, the time stamped data is sent to the central server for storage and labeled as class 2.

In the step 3, normal condition is resumed in the pipeline. Further, the differential input signals S1, S4, S2 & S3 are acquired and digitized. This digitized signal is then time stamped with GPS data. And finally, the time stamped data is sent to the central server for storage and labeled as class 3.

In the step 4, a plurality of features is extracted from 1 min time window with 1 second overlaps. The plurality of features is extracted from one-minute time window of signals S1, S2, S3 and S4. The plurality of features comprises time-frequency based and statistical features. Further, features are extracted from all the windows (joint time-frequency, wavelet, etc.). Finally, a feature selection algorithm such as principal component analysis (PCA) is used to generate the classifier model. This classifier model is then used to classify the input in one of the class 1, class 2 or class 3.

According to an embodiment of the disclosure, the system 100 is configured to provide the exact location ($X_L$) of the leakage along the segment of the pipeline 102, in case of oil or gas leakage. On identification of leak event, leak localization module is triggered. Time delay $\Delta tl$ between the signal S3 and signal S4 is calculated through a signal correlation technique. With known sound speed in fluid v, leak position $X_L$ can be calculated by equation 1 (length of the segment L between A and B is known). Once a leak event is detected, both an alarm is generated and sent to a server for further action by the monitoring team $$X_L = \frac{L - v\Delta tl}{2} \quad (1)$$

According to an embodiment of the disclosure, the system 100 is also configured to determine the exact location of theft ($X_T$) in the segment of pipeline 102 in case of theft. The equation (1) can be applied on S1 and S2 to localize theft after a theft event is detected. Here, theft position is $X_T$, and $\Delta tt$ represents time lag between the signals S3 and S4 and v is the sound speed in pipe metal.

$$X_T = \frac{L - v\Delta tt}{2} \quad (2)$$

Figure 4A:
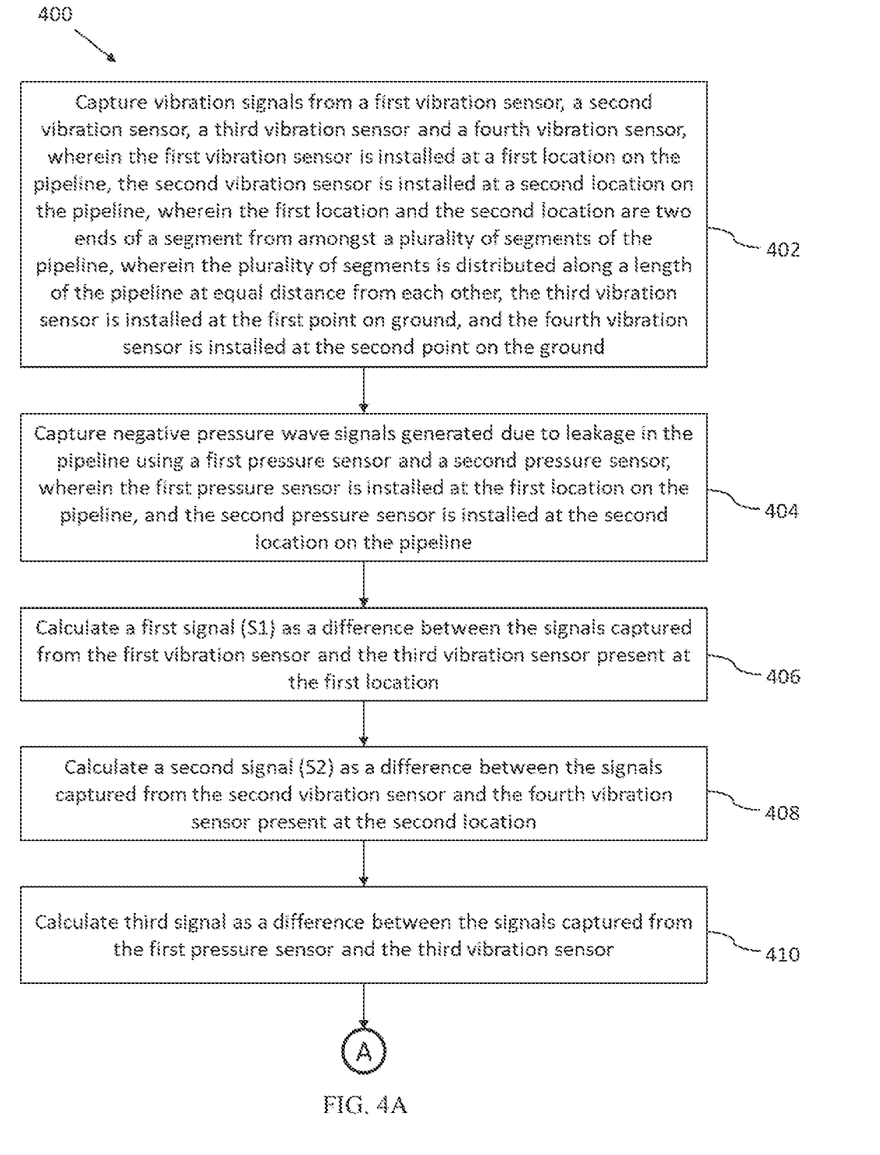
FIG. 4A through FIG. 4B is a flow diagram illustrating inspecting and detecting fluid leakage in the pipeline in accordance with some embodiments of the present disclosure.
Figure 4B:
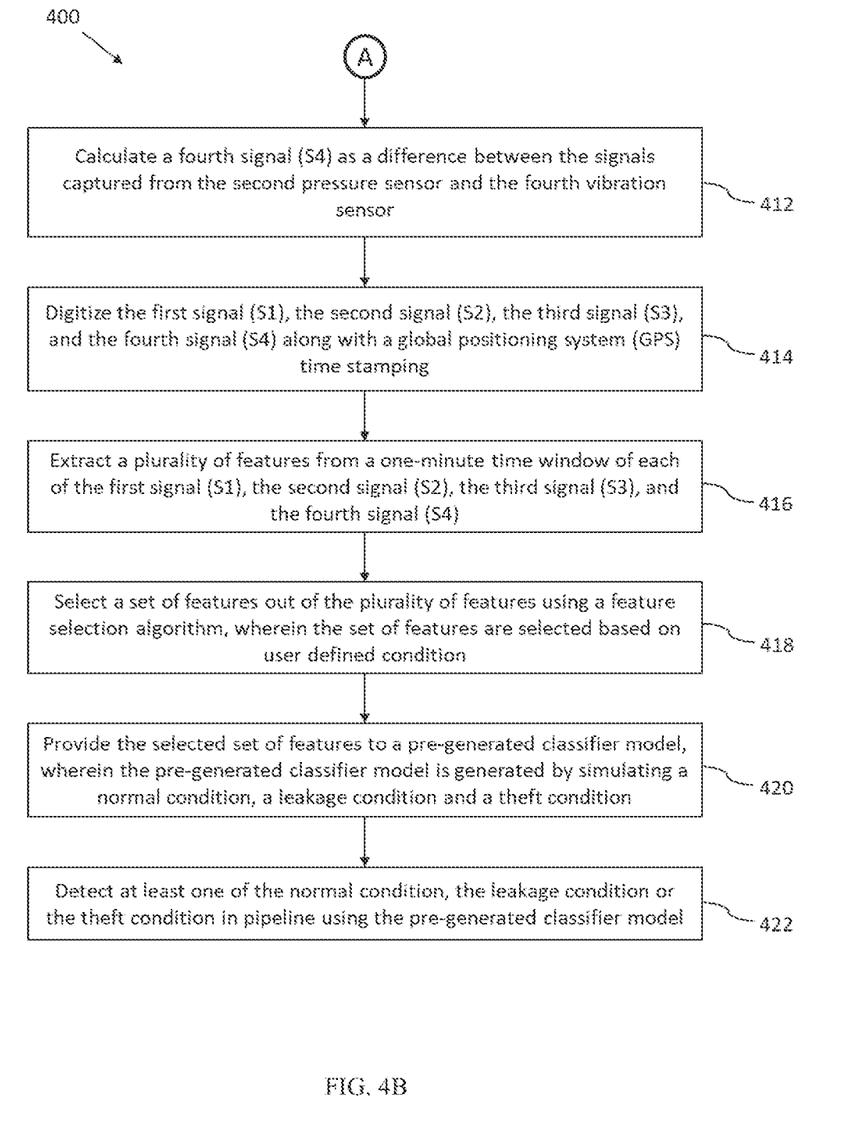

In operation, referring to FIG. 4A through FIG. 4B, flow diagram of a method 400 for inspecting and detecting fluid leakage in a pipeline is described in accordance with an example embodiment. The method 400 depicted in the flow chart may be executed by a system, for example, the system, 100 of FIG. 1. In an example embodiment, the system 100 may be embodied in the computing device as explained above.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 400 are described with help of system 100. However, the operations of the method 400 can be described and/or practiced by using any other system.

Initially, at step 402 of the method 400, vibration signals are captured from the first vibration sensor A, the second vibration sensor B, the third vibration sensor C and the fourth vibration sensor D. The first vibration sensor A is installed at the first location on the pipeline 102. The second vibration sensor B is installed at a second location on the pipeline 102. The first location and the second location are two ends of a segment from amongst a plurality of segments of the pipeline 102, wherein the plurality of segments is distributed along a length of the pipeline 102 at equal distance from each other. The third vibration sensor C is installed at the first location on ground. And the fourth vibration sensor D is installed at the second location on the ground.

Further, at step 404 of the method 400, the negative pressure wave signals generated due to leakage in the pipeline 102 are captured using the first pressure sensor P1 and the second pressure sensor P2. The first pressure sensor P1 is installed at the first location on the pipeline 102. And the second pressure sensor P2 is installed at the second location on the pipeline 102.

Further, at step 406 of the method 400, the first signal (S1) is calculated as a difference between the signals captured from the first vibration sensor A and the third vibration sensor C present at the first location. Similarly, at step 408, the second signal (S2) is calculated as a difference between the signals captured from the second vibration sensor B and the fourth vibration sensor D present at the second location. At step 410, the third signal (S3) is calculated as a difference between the signals captured from the first pressure sensor P1 and the third vibration sensor C. At step 412, the fourth signal (S4) is calculated as a difference between the signals captured from the second pressure sensor P2 and the fourth vibration sensor D.

Further, at step 414 of the method 400, the first signal (S1), the second signal (S2), the third signal (S3), and the fourth signal (S4) are digitized along with a global positioning system (GPS) time stamping. At step 416, the plurality of features is extracted from a one-minute time window of each of the first signal (S1), the second signal (S2), the third signal (S3), and the fourth signal (S4). Further at step 418, a set of features is selected out of the plurality of features using a feature selection algorithm such as principle component analysis (PCA), wherein the set of features are selected based on a user defined condition. The user defined condition is decided by a user, the user may decide a certain number to take a top set of features for feature selection algorithm. While in another example, the complete plurality of features may also be used for classification.

At step 420 of the method 400, the selected set of features is provided to the pre-generated classifier model, wherein the pre-generated classifier model is generated by simulating a normal condition, a leakage condition and a theft condition. And finally, at step 422, at least one of the normal condition, the leakage condition in the pipeline or the theft condition is detected in the pipeline 102 using the pre-generated classifier model. The method 400 may also be configured to generate the alarm in case leakage or theft is detected.

Figure 5:
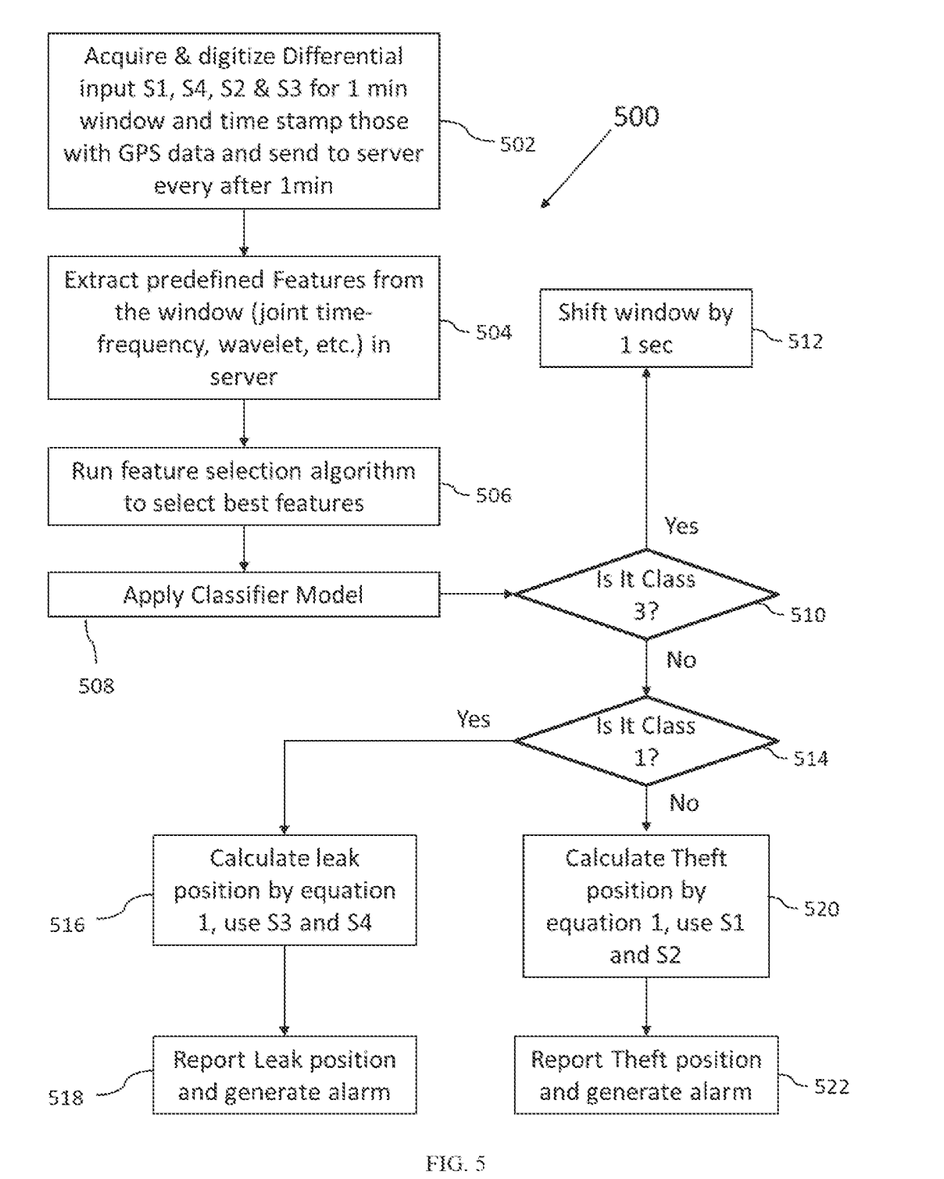
FIG. 5 is a flowchart showing steps involved in classification using the classifier model in accordance with some embodiments of the present disclosure.

According to an embodiment of the disclosure, a flowchart 500 is shown in FIG. 5 illustrating the steps involved in classification using the classifier model. Initially at step 502, differential inputs S1, S4, S2 & S3 are acquired and digitized for 1 min window. Further the digitized input is then time stamped with GPS data and sent to server every after 1 min. At step 504, a set of predefined features is extracted from the window (joint time-frequency, wavelet, etc.). At step 506, a feature selection algorithm is run to select a set of best features based on a predefined set of criteria used by the feature selection algorithm. The use of any feature selection algorithm such as principle component analysis (PCA) is well within the scope of this disclosure. At step 508, the classifier model is applied to selected set of features. At step 510, it is checked if it is class 3. If yes then at step 512, window is shifted by 1 second. If no then at step 514, it is checked if it is class 1. If yes, then at step 516 leak position is calculated by equation (1) using signal S3 and signal S4. At step 518, leak position is reported, and an alarm is generated. Further if the classified class is not class 1, then at step 520 the theft position is calculated by equation (2) using signal S1 and S2. And at step 522, theft position is reported, and the alarm is generated.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of accurate detection of fluid leakage over a long distance without detecting ambient interference. The embodiment thus provides a method and system for detecting and inspecting fluid leakage in pipelines.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for inspecting and detecting fluid leakage in a pipeline, comprising:
   capturing vibration signals from a first vibration sensor, a second vibration sensor, a third vibration sensor, and a fourth vibration sensor, wherein
      the first vibration sensor is installed at a first location on the pipeline,
      the second vibration sensor is installed at a second location on the pipeline,
      the first location and the second location are two ends of a segment of a plurality of segments of the pipeline,
      the plurality of segments is distributed along a length of the pipeline at an equal distance from each other,
      the third vibration sensor is installed at a first location on a ground, and
      the fourth vibration sensor is installed at a second location on the ground;
   capturing negative pressure wave signals generated due to leakage in the pipeline using a first pressure sensor and a second pressure sensor, wherein
      the first pressure sensor is installed at the first location on the pipeline, and
      the second pressure sensor is installed at the second location on the pipeline;
   calculating, via one or more hardware processors, a first signal as a difference between signals captured from the first vibration sensor and the third vibration sensor present at the first location;
   calculating, via the one or more hardware processors, a second signal as a difference between signals captured from the second vibration sensor and the fourth vibration sensor present at the second location;
   calculating, via the one or more hardware processors, a third signal as a difference between signals captured from the first pressure sensor and the third vibration sensor;
   calculating, via the one or more hardware processors, a fourth signal as a difference between signals captured from the second pressure sensor and the fourth vibration sensor;
   digitizing, via the one or more hardware processors, the first signal, the second signal the third signal, and the fourth signal along with a global positioning system (GPS) time stamping;
   extracting, via the one or more hardware processors, a plurality of features from a one-minute time window of each of the first signal, the second signal, the third signal, and the fourth signal;
   selecting, via the one or more hardware processors, a set of features out of the plurality of features using a feature selection algorithm, wherein the set of features are selected based on a user defined condition;
   providing, via the one or more hardware processors, the selected set of features to a pre-generated classifier model, wherein the pre-generated classifier model is generated by simulating a normal condition, a leakage condition, and a theft condition; and
   detecting, via the one or more hardware processors, at least one of the normal condition, the leakage condition in the pipeline, and the theft condition in the pipeline using the pre-generated classifier model.

2. The processor implemented method of claim 1, further comprising identifying an exact location of the leakage or a theft along the length of the pipeline.

3. The processor implemented method of claim 2, wherein identifying the exact location of the leakage is determined using following equation:

$$X_L = \frac{L - v\Delta tl}{2},$$

where, $X_L$ is the exact location of the leakage,
L is the length of the segment,
$\Delta tl$ is the time delay between the third signal and the fourth signal, and
v is the sound speed in pipe metal.

4. The processor implemented method of claim 2, wherein identifying the exact location of the theft is determined using following equation:

$$X_T = \frac{L - v\Delta tt}{2},$$

where, $X_T$ is the exact location of the theft,
L is the length of the segment,
$\Delta tt$ is the time delay between the first signal and the second signal, and
v is the sound speed in pipe metal.

5. The processor implemented method of claim 1, further comprising generating an alarm in case of detection of the leakage or a theft.

6. The processor implemented method of claim 1, wherein the step of providing the selected set of features to the pre-generated classifier model is preceded by the following steps:
simulating the leakage condition in the pipeline for a predefined time window;
capturing the first signal, the second signal, the third signal, and the fourth signal corresponding to the leakage condition;
digitizing, via the one or more hardware processors, the first signal, the second signal, the third signal, and the fourth signal corresponding to the leakage condition with the global positioning system (GPS) time stamping;
labelling the digitized signal corresponding to the leakage condition as class 1;
simulating the theft condition in the pipeline for the predefined time window;
capturing the first signal, the second signal, the third signal, and the fourth signal corresponding to the theft condition;
digitizing, via the one or more hardware processors, the first signal, the second signal, the third signal, and the fourth signal corresponding to the theft condition with the global positioning system (GPS) time stamping;
labelling the digitized signal corresponding to the theft condition as class 2;
simulating the normal condition in the pipeline for the predefined time window;
capturing the first signal, the second signal, the third signal, and the fourth signal corresponding to the normal condition;
digitizing, via the one or more hardware processors, the first signal, the second signal, the third signal, and the fourth signal corresponding to the normal condition with the global positioning system (GPS) time stamping;
labelling the digitized signal corresponding to the normal condition as class 3;
extracting the plurality of features from the predefined time window of each of the first signal, the second signal, the third signal, and the fourth signal;
selecting, via the one or more hardware processors, the set of features out of the plurality of features using the feature selection algorithm, wherein the set of features are best features selected based on the predefined condition; and
obtaining the pre-generated classifier model using the selected set of features.

7. The processor implemented method of claim 1, wherein the step of detecting at least one of the normal condition, the leakage in the pipeline, or the theft condition in the pipeline comprises identifying the normal condition, the leakage condition, and the theft condition if the pre-generated classifier model predicts class 3, class 1, and class 2 respectively.

8. The processor implemented method of claim 1, wherein the plurality of features comprises a plurality of time-frequency based features and a plurality of statistical features.

9. A system for inspecting and detecting fluid leakage in a pipeline, the system comprising:
a first vibration sensor, a second vibration sensor, a third vibration sensor, and a fourth vibration sensor for capturing vibration signals, wherein
the first vibration sensor is installed at a first location on the pipeline,
the second vibration sensor is installed at a second location on the pipeline,
the first location and the second location are two ends of a segment of a plurality of segments of the pipeline,
the plurality of segments is distributed along a length of the pipeline at an equal distance from each other,
the third vibration sensor is installed at a first location on a ground, and
the fourth vibration sensor is installed at a second location on the ground;
a first pressure sensor and a second pressure sensor for capturing negative pressure wave signals generated due to leakage in the pipeline, wherein
the first pressure sensor is installed at the first location on the pipeline, and
the second pressure sensor is installed at the second location on the pipeline;
one or more hardware processors;
a memory in communication with the one or more hardware processors, wherein the one or more hardware processors are configured to execute programmed instructions stored in the memory, to:
calculate, a first signal as a difference between the signals captured from the first vibration sensor and the third vibration sensor present at the first location;
calculate a second signal as a difference between the signals captured from the second vibration sensor and the fourth vibration sensor present at the second location;
calculate a third signal as a difference between the signals captured from the first pressure sensor and the third vibration sensor;
calculate a fourth signal as a difference between the signals captured from the second pressure sensor and the fourth vibration sensor;
digitize the first signal, the second signal, the third signal, and the fourth signal along with a global positioning system (GPS) time stamping;
extract a plurality of features from a one-minute time window of each of the first signal, the second signal, the third signal, and the fourth signal;
select a set of features out of the plurality of features using a feature selection algorithm, wherein the set of features are selected based on a user defined condition;
provide the selected set of features to a pre-generated classifier model, wherein the pre-generated classifier model is generated by simulating a normal condition, a leakage condition, and a theft condition; and
detect at least one of the normal condition, the leakage condition in the pipeline, and the theft condition in the pipeline using the pre-generated classifier model.

10. The system of claim 9, wherein the one or more hardware processors are further configured to identify an exact location of the leakage or a theft along the length of the pipeline.

11. The system of claim 10, wherein identifying the exact location of the leakage is determined using following equation:

$$X_L = \frac{L - v\Delta tl}{2},$$

where, $X_L$ is the exact location of the leakage,
L is the length of the segment,
Δtl is the time delay between the third signal and the fourth signal, and
v is the sound speed in pipe metal.

12. The system of claim 10, wherein identifying the exact location of the theft is determined using following equation:

$$X_T = \frac{L - v\Delta tt}{2},$$

where, $X_T$ is the exact location of the theft,
L is the length of the segment,
Δtt is the time delay between the first signal and the second signal, and
v is the sound speed in pipe metal.

13. The system of claim 9, wherein the one or more hardware processors are further configured to generate an alarm in case of detection of the leakage or a theft.

14. One or more non-transitory machine readable information storage mediums comprising one or more instructions which when executed by one or more hardware processors cause managing a plurality of events, the instructions cause:
  capturing vibration signals from a first vibration sensor, a second vibration sensor, a third vibration sensor, and a fourth vibration sensor, wherein
    the first vibration sensor is installed at a first location on the pipeline,
    the second vibration sensor is installed at a second location on the pipeline,
    the first location and the second location are two ends of a segment of a plurality of segments of the pipeline,
    the plurality of segments is distributed along a length of the pipeline at an equal distance from each other,
    the third vibration sensor is installed at a first location on ground, and
    the fourth vibration sensor is installed at a second location on the ground;
  capturing negative pressure wave signals generated due to leakage in the pipeline using a first pressure sensor and a second pressure sensor, wherein
    the first pressure sensor is installed at the first location on the pipeline, and
    the second pressure sensor is installed at the second location on the pipeline;
  calculating a first signal as a difference between signals captured from the first vibration sensor and the third vibration sensor present at the first location;
  calculating a second signal as a difference between signals captured from the second vibration sensor and the fourth vibration sensor present at the second location;
  calculating a third signal as a difference between signals captured from the first pressure sensor and the third vibration sensor;
  calculating a fourth signal as a difference between signals captured from the second pressure sensor and the fourth vibration sensor;
  digitizing the first signal, the second signal, the third signal, and the fourth signal along with a global positioning system (GPS) time stamping;
  extracting a plurality of features from a one-minute time window of each of the first signal, the second signal, the third signal, and the fourth signal;
  selecting a set of features out of the plurality of features using a feature selection algorithm, wherein the set of features are selected based on user defined condition;
  providing the selected set of features to a pre-generated classifier model, wherein the pre-generated classifier model is generated by simulating a normal condition, a leakage condition, and a theft condition; and
  detecting at least one of the normal condition, the leakage condition in the pipeline, and the theft condition in the pipeline using the pre-generated classifier model.

* * * * *